May 30, 1967     J. N. SCOTT, JR     3,322,869
PROCESS AND APPARATUS FOR MAKING MULTIWALLED ARTICLE
Filed July 11, 1963     3 Sheets-Sheet 1

INVENTOR.
J.N. SCOTT, JR.

BY Young & Quigg

ATTORNEYS

United States Patent Office 3,322,869
Patented May 30, 1967

3,322,869
PROCESS AND APPARATUS FOR MAKING MULTIWALLED ARTICLE
John N. Scott, Jr., Bartlesville, Okla., assignor to Phillips Petroleum Company, a corporation of Delaware
Filed July 11, 1963, Ser. No. 294,298
3 Claims. (Cl. 264—90)

This invention relates to a method and an apparatus for making multiwalled plastic articles.

Many articles formed from plastic materials are being used extensively in various industries. In particular, the packaging industry has widely accepted the use of plastics in containers because of their versatility and economic value. However, due to the expanding growth of plastics in the packaging industry, several limitations have been found due to the nature of the various plastics available. For example, some types of plastics are incompatible with certain products desired to be packaged. One limitation, in particular, is that the available plastics do not possess the strength, when formed into a container, to withstand the requirements for packaging certain products. Such applications are those where the product is to be packaged under considerable high pressure, that is, for example, the rapidly expanding use of aerosol bombs. In the past, numerous attempts have been made to increase the strength of plastic containers to meet the various requirements of the packaging industry. Some such attempts have been to increase the wall thickness of the containers, to coat the plastic containers with various materials, and to orient the plastic used in the containers. These attempts have not been acceptable because of the added expense involved in the manufacture of the containers which makes their use in the industry uneconomical. Plastic fabricators have found it quite difficult to produce plastic articles without some type of flaw. Particularly, fabricators are faced with the problem of wall thinning in producing plastic containers. The thinning of the wall thickness in a container produces weak spots which reduce the strength of the container and its versatility.

An object of this invention is to provide a method for molding plastic containers having improved strength. Still another object of this invention is to provide an improved method for the manufacture of articles having a laminated structure. Still another object of this invention is to provide an apparatus for the manufacture of laminated articles.

Other objects and advantages of this invention will be apparent from a study of this disclosure, the drawing and the appended claims.

Broadly, this invention comprises enclosing a preformed plastic article in a layer of plastic material, and evacuating the space between the article and the plastic layer.

Plastic articles may be fabricated by numerous methods. One method which has found wide acceptance is that of blow molding. In blow molding the plastic material is made molten in a plasticating machine, such as an extruder, and a parison of the molten plastic is extruded between open mold halves. The mold halves are then closed around the parison and air is introduced into the parison to conform it to the shape of the mold cavity. The shaped parison is allowed to cool while confined in the mold. After sufficient cooling time has elapsed, the mold is opened and the plastic article removed.

In accordance with one embodiment of this invention, a container having improved strength and versatile properties is fabricated by first positioning a preformed plastic container under a die that will extrude a tube of molten plastic material. The preformed container may be fabricated to the desired configuration by any of the known molding methods, such as injection molding, thermoforming, and the above-described blow molding. A parison of molten plastic material is then extruded around the preformed container in close relationship thereto. The parison is stretched longitudinally to reduce its diameter about the preformed container and remove excess polymer therein. The parison is then clamped at both ends, thus enclosing the preformed container within the parison. The space between the parison and the preformed container is then evacuated to cause the parison to take the shape of the container, make intimate contact, and fuse thereto. The parison is allowed to cool, while in close relationship with the preformed container, which allows it to take shape and fuse to the preformed container. The parison, upon cooling, shrinks to form a tight fitting about the preformed container, thus exerting a considerable stress against the inner container. The resultant prestressed container possesses much added strength, as compared to single wall plastic containers.

Depending upon the properties of the article that is desired, the preformed article and the external layer may be of the same plastic material or of different plastic materials. Therefore, a container having improved strength may be formed by this invention to package a product in a plastic material which does not possess sufficient strength when fabricated by the methods known today. A wide variety of containers may be formed by this invention possessing different properties to meet the requirements of the packaging industry by using various combinations of the available plastic materials for the preformed containers and the laminated layer. For example, the preformed container may be fabricated from a plastic material compatible with the product to be packaged and an external layer formed from a plastic material having greater strength. This invention alleviates the inherent problem of flaws and weak spots in fabricated plastic articles. Each layer covers the flaws in the other layer, thereby reinforcing the weak areas to improve the over-all strength of the container and eliminate the disadvantages of the single-walled container. The preformed article and outer layer may be of the same or of different wall thickness depending upon the properties desired in the finished article. Also, a plurality of layers of plastic material may be applied to a preform in accordance with this invention. Thus, typical properties of several plastic materials may be combined in one article.

The preformed container used in this invention may be coated with a material to add particular properties to the final product prior to the application of the external layer of plastic material. These coatings may be of various materials such as those that are effective to make a plastic item less permeable. Also, the preformed container may be designed, printed, or colored prior to the application of the external layer. The coating material on the preform will be protected from environmental degradation by being enclosed between the layers of the container.

All plastic materials which lend themselves to extrusion from a melt are applicable to this invention. Such materials comprise the polymers of mono 1-olefins. These polymers may be homopolymers such as polyethylene and polypropylene, copolymers such as ethylene-butene-1 copolymers, and a blend of such polymers. In addition, materials such as polyvinylchloride and polystyrene are applicable.

The invention will now be described more fully with reference to the accompanying drawings wherein.

Figure 1:
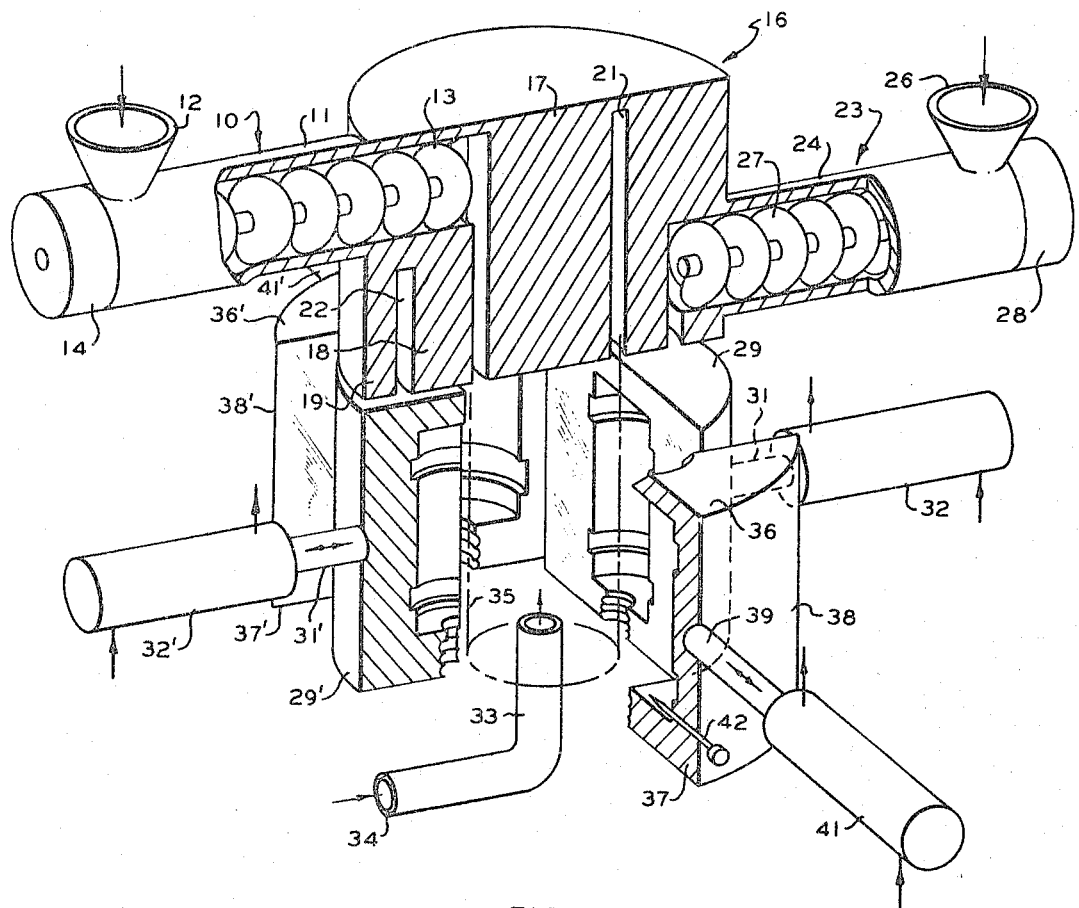
FIGURE 1 is a dimetric view, in partial cross section, of an embodiment of the apparatus of this invention, showing the molding of the preformed container.
Figure 1A:
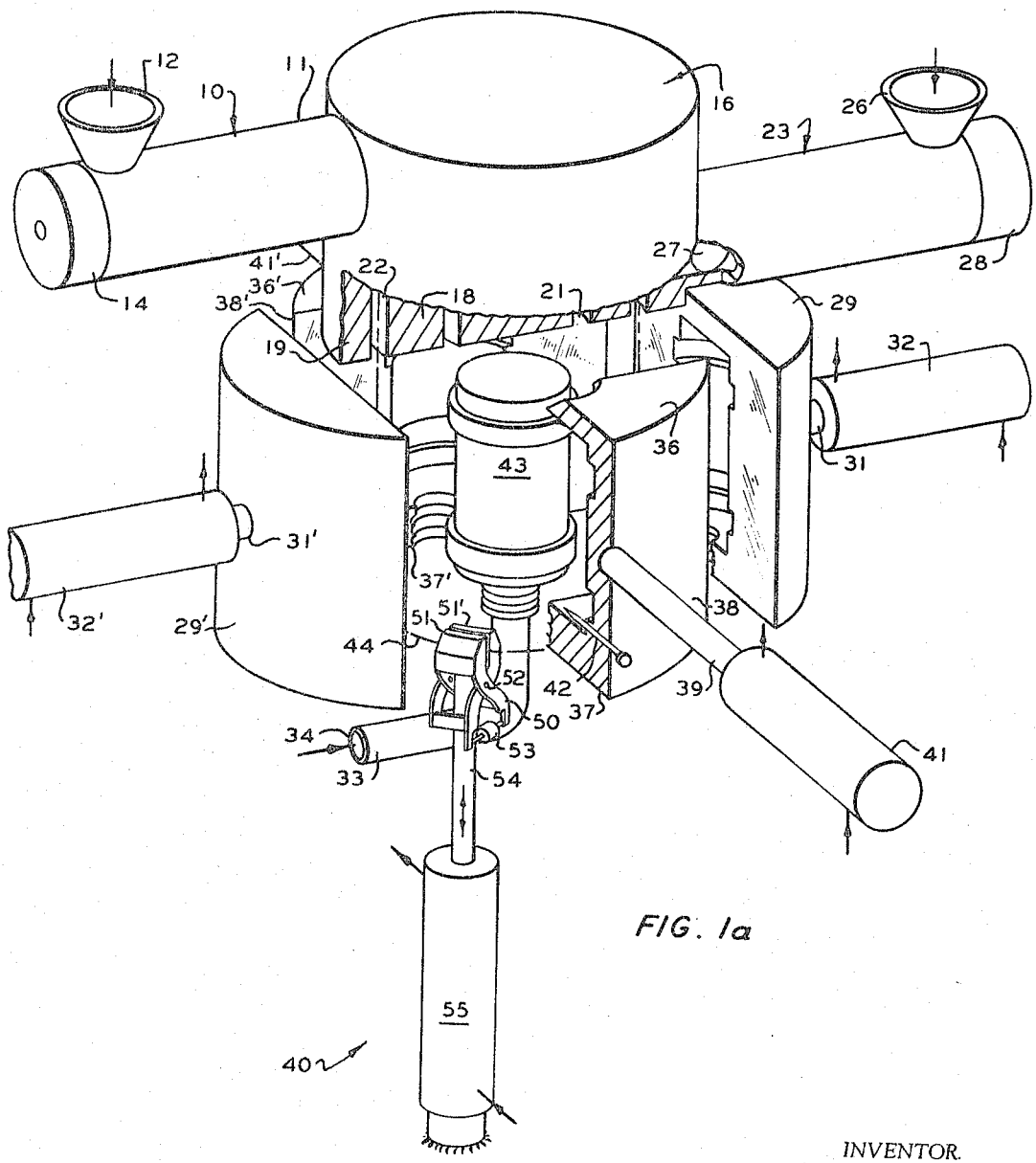
FIGURE 1A is a dimetric view, in partial cross section, of the apparatus forming the outer parison.

Referring now to FIGURE 1, plasticating means 10 shown as an extruder comprising hollow cylinder 11, screw 13 axially aligned within said cylinder, motor 14 connected to said screw 13 for rotating same, and feed hopper 12. Parison die 16 comprises inner mandrel 17, outer mandrel 18 concentrically disposed about mandrel 17 forming inner annular area 21, and outer member 19 concentrically disposed about mandrel 18 forming outer annular area 22. Plasticating means 23 shown as an additional extruder comprising hollow cylinder 24, screw 27 axially aligned within said cylinder, motor 28 connected to said screw 27 for rotating same, and feed hopper 26. The outlet of extruder 10 enters directly into annular area 21 from which parison 35 issues. The outlet of extruder 23 enters annular area 22 from which parison 44 issues, shown in FIGURE 1A. Mold 29, positioned in alignment directly under die 16, comprises movable halves 29 and 29'. Said mold halves are operated by connecting rods 31 and 31' and air cylinders 32 and 32'. Rigidly supported mandrel 33 is positioned in alignment directly under die 16 and movable mold halves 29 and 29' for co-operation with said mold halves in forming the neck portion of a container. Mandrel 33 has conduit 34 through it for the introduction of positive fluid pressure from a source not shown. Parison-forming means 38 and 38' are positioned in alignment directly under die 16, offset 90 degrees from mold halves 29 and 29', respectively. Forming means 38 comprises upper parison severing and clamping means 36 and 36' and lower parison clamping and neck-forming means 37 and 37'. Said parison-forming means are operated by connecting rods 39 and 39' and air cylinders 27 and 27'. Needle valve 42, associated with forming means 38, is connected to evacuating means, not shown. In FIGURE 1A, vertically movable means 40, positioned in alignment under forming means 38 and 38', receives the leading end of parison 44 and stretches it longitudinally. Movable means 40 shown as a clamp 50 comprises jaws 51 and 51' pivoted at hinge 52 and operated by solenoid valves 53 and 53' activated by a circuit and switch, not shown. Clamp 50 is vertically operated by connecting rod 54 and air cylinder 55. Movable means 40 may be a single clamp as shown or a plurality of clamps positioned around the parison. The clamp may be any means which grip and hold the parison.

Figure 3:
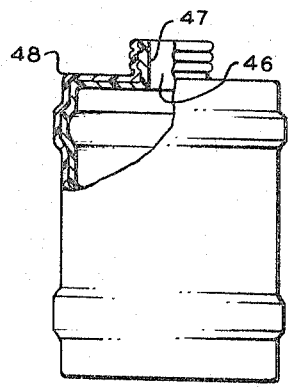
FIGURE 3 is a sectional view, in partial cross section, of a double-walled, laminated container formed by this invention.

In FIGURE 3 a laminated prestressed container 46 formed in accordance with this invention comprises inner layer 47 and outer laminated layer 48.

*Example*

Figure 2:
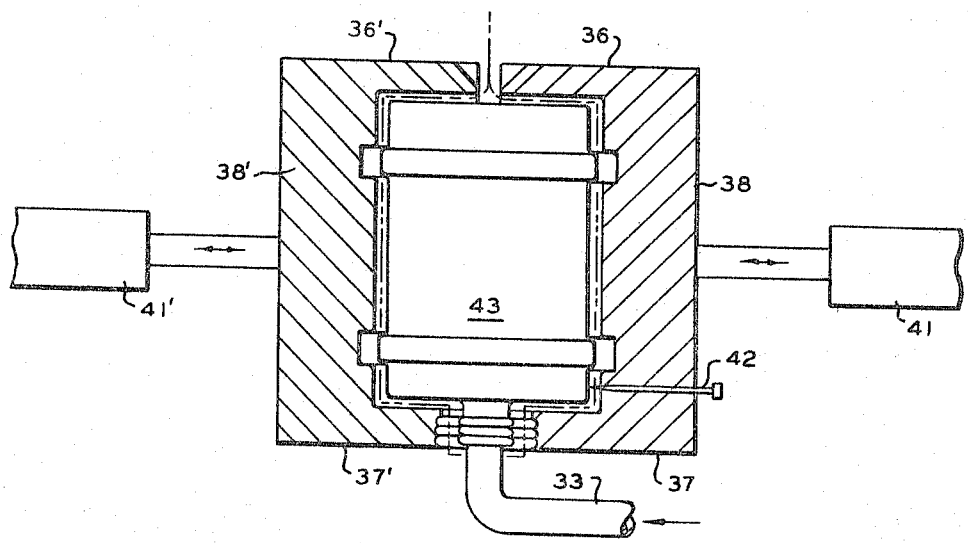
FIGURE 2 is an elevational view, in partial cross section, of apparatus forming the outer parison.

Pellets of polyethylene having a density of 0.960 gram per cc. as measured by ASTM D–1505–57P and a melt index of 0.2 as measured by ASTM D–1238–57P are introduced through hopper 12 into extruder 10 wherein they are made molten by screw 13 and heating means, not shown. The polyethylene is increased in temperature to about 400° F. in extruder 10. The molten polyethylene is forced through annular area 21 to extrude parison 35 between mold halves 29 and 29' and over mandrel 33. After the parison is extruded, the mold halves are closed by the action of air on cylinders 32 and 32' about the parison and mandrel 33. Upon closing of the mold halves air is introduced through conduit 34 which expands the parison 35 to the shape of the mold cavity. The shaped parison is allowed to cool while confined in the closed mold. After sufficient cooling time the mold halves are opened, leaving the preformed container positioned on mandrel 33. Pellets of a copolymer of ethylene and butene-1 having a density of 0.950 gram per cc. as measured by ASTM D1505–57P and a melt index of 0.3 as measured by ASTM D1238–57P are introduced through hopper 26 into extruder 23 wherein they are made molten by the action of screw 27 and additional heat applied by heaters, not shown. The copolymer is increased in temperature to about 400° F. in extruder 23. The molten copolymer is forced from extruder 23 through annular area 22 for extruding parison 44 around preformed container 43. Parison 44 is then stretched longitudinally by means 40 which attach to and hold the leading end of parison 44 and move downwardly away from the die thus pulling the parison lengthwise and reducing its diameter around preformed container 43. Forming means 38 and 38' are then closed about parison 44 as shown in FIGURE 2 to close the open ends of the parison. Needle valve 42 severs parison 44 and a vacuum is drawn through needle valve 42, evacuating the space between 44 and preformed container 43. This evacuation causes parison 44 to make intimate contact with the surface of preformed container 43. Parison 44, while in intimate contact with preformed container 43, is cooled. As parison 44 cools, it shrinks tightly about preformed container 43, forming a fusion bond therewith and exerting considerable stress thereto. The container thus produced is capable of withstanding considerably higher pressures than previously molded containers of similar wall thickness.

The above description in reference to the drawing and operation thereof with the specific example of this invention are for description only and are not intended in any way to be a limiting factor thereto.

Reasonable variations and modifications are possible within the scope of the disclosure, the drawings and the appended claims.

That which is claimed is:

1. A method of forming multiwalled plastic containers which comprises the steps of extruding a parison of molten plastic material, closing a molding means around said parison, injecting a fluid into said parison to form the container, removing the container from said mold, extruding a second parison about said formed container, closing said second parison airtight about said container, evacuating the space between said parison and container to cause intimate contact and fusion bonding therebetween, and cooling said second parison while in airtight relationship with said formed container to cause shrinkage of said second parison.

2. A method of forming multiwalled plastic containers which comprises the steps of extruding a parison of molten plastic material, closing a molding means around said parison, injecting a fluid into said parison to form the container, removing the container from said mold, extruding a second parison about said formed container, drawing said parison longitudinally, closing said second parison airtight about said container, evacuating the space between said parison and container to cause intimate contact and fusion bonding therebetween, and cooling said second parison while in airtight relationship with said formed container to cause shrinkage of said second parison.

3. Apparatus for molding plastic materials which comprises the combination of first and second extruders; a die having first and second concentric annular openings; said first and second extruders communicating respectively with said first and second annular openings in said die; movable mold halves positioned in alignment under said die for receiving a parison from said first annular opening in said die; means for closing and opening said mold halves; mandrel means positioned under said die co-operating with said mold halves; means for introducing positive fluid pressure through said mandrel into said parison; movable frame halves positioned in alignment, offset 90° from said movable mold halves, under said die for receiving a parison from said second annular opening in said die; means for closing and opening said frame halves; and means for evacuating air from within said parison.

References Cited

UNITED STATES PATENTS

| | | | |
|---|---|---|---|
| 2,710,987 | 6/1955 | Sherman | 264—97 |
| 2,781,551 | 2/1957 | Richerod | 264—98 |
| 2,890,483 | 6/1959 | Soubier. | |
| 2,961,214 | 11/1960 | Freed | 264—342 |
| 3,082,484 | 3/1963 | Sherman. | |
| 3,088,166 | 5/1963 | Colombo | 264—90 |
| 3,103,036 | 9/1963 | Nave et al. | 264—98 |
| 3,125,619 | 3/1964 | Miller | 264—98 |

ROBERT F. WHITE, *Primary Examiner.*

L. S. SQUIRES, A. R. NOE, *Assistant Examiners.*